(12) United States Patent
Tanaka et al.

(10) Patent No.: US 7,978,775 B2
(45) Date of Patent: Jul. 12, 2011

(54) FREQUENCY OFFSET DETECTOR

(75) Inventors: Masato Tanaka, Tokyo (JP); Hiroji Akahori, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 842 days.

(21) Appl. No.: 11/923,811

(22) Filed: Oct. 25, 2007

(65) Prior Publication Data

US 2008/0101519 A1  May 1, 2008

(30) Foreign Application Priority Data

Oct. 31, 2006  (JP) ................. 2006-296974

(51) Int. Cl.
*H04K 1/10* (2006.01)
*H04L 27/28* (2006.01)

(52) U.S. Cl. ........ 375/260; 375/344; 375/371; 375/375; 370/203; 370/208

(58) Field of Classification Search .......... 375/260, 375/344, 371, 375; 370/203–211
See application file for complete search history.

(56) References Cited

U.S. PATENT DOCUMENTS 6,728,301 B1 * 4/2004 Chrisikos ............... 375/147

FOREIGN PATENT DOCUMENTS

| JP | 2004-153811 | 5/2004 |
|----|-------------|--------|
| JP | 2005-045664 | 2/2005 |

* cited by examiner

*Primary Examiner* — Curtis B Odom
(74) *Attorney, Agent, or Firm* — Studebaker & Brackett PC; Donald R. Studebaker

(57) ABSTRACT

A frequency offset detector is provided which is adaptable to a great frequency offset of one or more carrier waves in an OFDM signal. The frequency offset detector comprises a multiplication circuit which multiplies, by a pseudorandom number bit sequence, a reception signal generated by Fourier transformation of an OFDM modulated signal wherein pilot symbols are dispersed and arranged in accordance with four kinds of patterns and periodically transmitted. Four arithmetic circuits extract the pilot symbols corresponding to the respective patterns from a result of the multiplication by the multiplication circuit for each of the four kinds of patterns and calculate the sum of phase differences among the extracted pilot symbols to output an absolute value. A detection circuit detects a frequency offset on the basis of a maximum value of the absolute values calculated by the four arithmetic circuits. A complex sinusoidal wave is generated on the basis of the detected frequency offset, and the frequency of an input signal is converted thereby, such that the offset of the reception signal can be corrected.

24 Claims, 6 Drawing Sheets

FREQUENCY OFFSET DETECTOR IN EMBODIMENT 1 OF PRESENT INVENTION

CONVENTIONAL FREQUENCY CORRECTING SYSTEM

FREQUENCY OFFSET AND FFT OUTPUT

RECEPTION SIGNAL

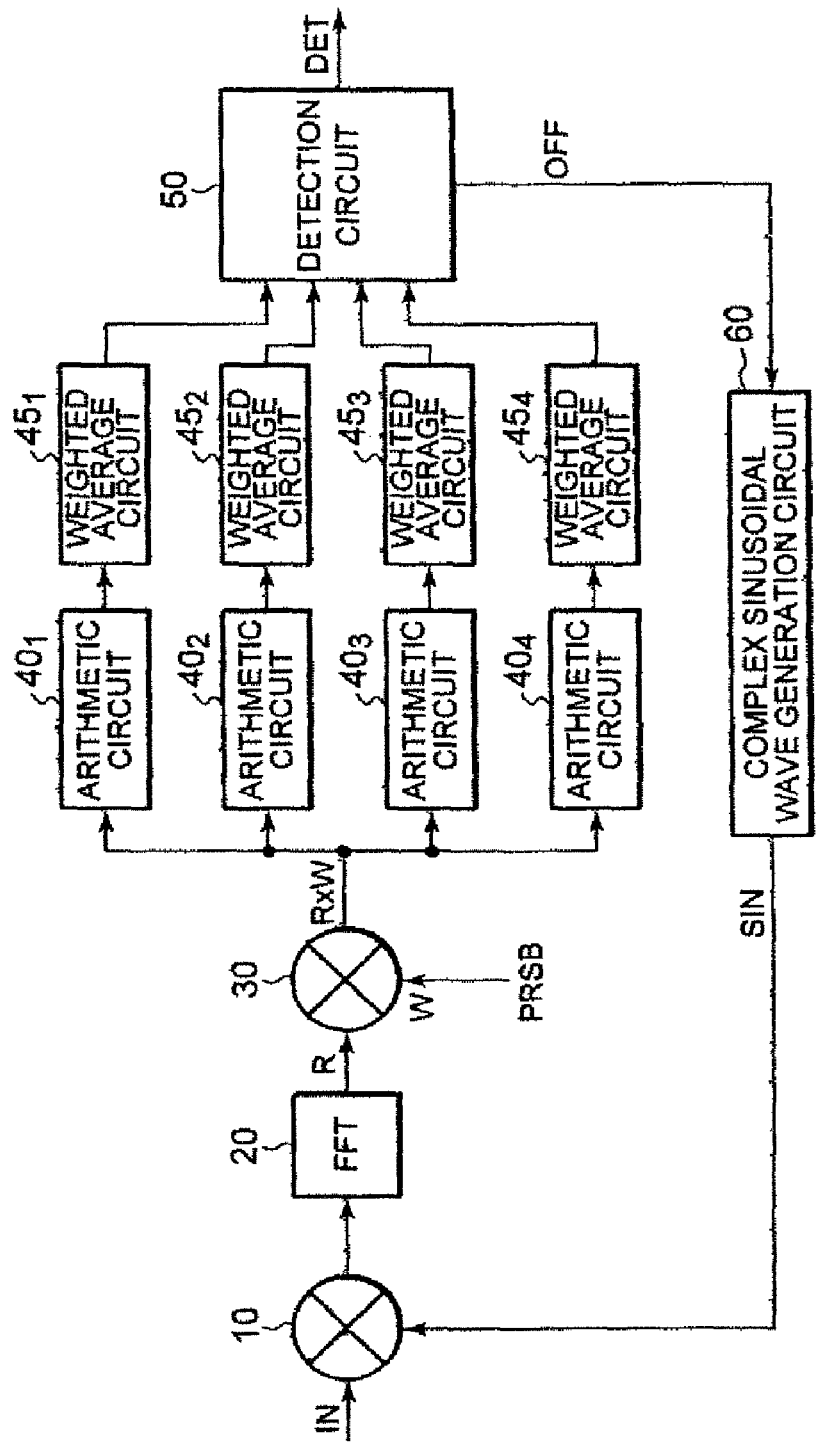

FREQUENCY OFFSET DETECTOR

CROSS REFERENCE TO RELATED DOCUMENTS

This application claims priority under 35 U.S.C. §119 to Japanese Patent Application Serial No. 2006296974 filed Oct. 31, 2006, the entire disclosure of which is hereby incorporated by reference herein.

BACKGROUND OF THE INVENTION

1. Field of the Invention

The present invention relates to a frequency offset detector and method for detecting the frequency offset of a reception signal in, for example, integrated services digital broadcasting-terrestrial (ISDB-T).

2. Description of the Related Art

A broadcast signal of ISDB-T is constituted of 13 orthogonal frequency division multiplex (OFDM) segments (hereinafter simply referred to as "segments") in the case of television broadcasting and one to three segments in the case of radio broadcasting. One segment is a packet of a predetermined number (e.g., 108 in Mode 1) of carrier waves corresponding to a transmission mode, and has a band of about 430 kHz. The carrier waves include a control information carrier modulated by a predetermined modulation method, and a data carrier which is modulated by a modulation method indicated by the control information carrier and which transmits the main information of a broadcast.

In one segment, each carrier wave is modulated by an individual complex symbol (a so-called IQ symbol which indicates an orthogonal component of an information signal with a real part and an imaginary part) at every symbol period (modulation period: about 1 ms), and multiplexed into one OFDM symbol and transmitted. Thus, 204 OFDM symbols constitute one transmission frame.

FIG. 2 is a diagram showing an example of the configuration of the transmission frame of the ISDB-T. In FIG. 2, there are shown carriers that are arranged from left to right in ascending order of frequencies, and OFDM symbols that are arranged from the top to bottom in order of time. One complex symbol c(n, k) for modulating a carrier k during the period of a symbol number n is positioned in a cell where the carrier and the OFDM symbol intersect with each other. Therefore, this diagram shows the arrangement of the carriers of the complex symbols c(n, k) in order of frequency and time.

Symbols marked "SP" in FIG. 2 represent SP symbols which are pilot symbols indicating reference values used for the equalization of signals. The SP symbol is transmitted by one out of three carriers once in four symbol periods in order of time. Moreover, the SP symbol is transmitted by one out of twelve carriers in all the symbol periods in order of frequencies.

Furthermore, the symbol marked "TMCC" in FIG. 2 transmits a transmission and multiplexing configuration control (TMCC) signal using the predetermined control information carrier. The TMCC signal includes synchronization symbols indicating the synchronization timing of the frames in symbol numbers 1 to 16, segment format identification symbols in symbol numbers 17 to 19, and TMCC information symbols indicating the kind of the segment, the modulation method, etc. in symbol numbers 20 to 121. In addition, the control information carrier is set to be modulated by a differential binary phase shift keying (DBPSK) method. Moreover, symbols which are not marked either "SP" or "TMCC" in FIG. 2 are data symbols for transmitting the main information of a broadcast.

While such a broadcast signal is transmitted as a radio signal RF of 450 to 700 MHz, a phenomenon called a multipath occurs wherein radio waves reflected by buildings and walls and traveling through various paths reach a receiving end in addition to radio waves directly reaching a receiving antenna from an antenna of a sending end. If the multipath occurs, the reflected radio waves arrive later than the radio waves directly reaching the receiving antenna from the sending antenna, so that a signal coming later overlaps a signal coming first and it is difficult to accurately receive the signals. Thus, in the OFDM method, a guard interval is used to prevent the overlap of the signals.

Specifically, a large number of carrier waves are used to simultaneously send data in the OFDM method, and when each carrier wave carries data, the whole second half of a signal modulated from the data is copied and attached to the head of this signal and thus sent instead of sending the signal modulated from the data as it is. This copied part is the guard interval. The attachment of the guard interval to the original signal makes one symbol longer, but a part with no overlap long enough to extract the original signal remains owing to redundancy corresponding to the guard interval even if the signal coming later overlaps the signal coming first to some extent at the time of reception due to the occurrence of the multipath. This can minimize the effect of the multipath. Moreover, this guard interval is also used to correct a reception frequency.

FIG. 3 is a diagram of the configuration of a frequency correcting system in a conventional OFDM receiver. In this frequency correcting system, a received input signal IN is provided to a frequency conversion circuit 1, and converted to an intermediate frequency signal IF by an automatic frequency control signal AFC and then output to an autocorrelation detector 2. The autocorrelation detector 2 finds the autocorrelation function of the intermediate frequency signal IF, and this autocorrelation function is provided to a frequency controller 3. On the basis of the autocorrelation function, the frequency controller 3 generates an automatic frequency control signal AFC such that the intermediate frequency signal IF has a predetermined frequency, and the automatic frequency control signal AFC is fed back to the frequency conversion circuit 1. Thus, the intermediate frequency signal IF output from the frequency conversion circuit 1 is controlled so that it has the predetermined frequency. In addition, the intermediate frequency signal IF controlled to have the predetermined frequency is provided to a fast Fourier transform circuit (hereinafter referred to as "FFT") 4, and transformed into a reception signal R(n, k) converted to a signal for each carrier wave forming a segment.

The frequency correcting systems, described above, have been utilized throughout the prior art. For example, Japanese Patent Publication Laid-open No. 2004-153811 provides a discussion of broadcast signals including a disclosure of television broadcasting and radio broadcasting segments wherein a frequency correcting system is described therein. Another exemplary frequency correcting system is disclosed by Japanese Patent Publication Laid-open No. 2005-45664.

However, in the frequency correcting systems described above, the guard interval provided for each symbol is used to generate the automatic frequency control signal AFC. This makes it impossible to make a correction when one or more rotations (corresponding to the frequency of one carrier wave) are produced by the frequency offset within one effective symbol. That is, if the frequency of the intermediate frequency signal IF is shifted by the frequency offset, the SP symbol is shifted from a regular carrier number 0 to a carrier number 1 or carrier number 2 as shown in FIG. 4, so that no SP symbol is contained in the reception signal of the carrier number 0 output from the FFT 4 and data can not be normally received.

Although the frequency correction systems discussed hereinabove provide a degree of automatic frequency control, further improvement to correct frequency offset is desirable.

SUMMARY OF THE INVENTION

The foregoing needs are met, to a great extent, by the present invention, wherein in one aspect a frequency offset detector is provided that in some embodiments provides a frequency offset detector including a multiplication circuit which multiplies, by a pseudorandom number bit sequence, a reception signal generated by demodulating an orthogonal frequency division multiplex modulated signal wherein pilot symbols are dispersed and arranged in accordance with N kinds of patterns and periodically transmitted. N arithmetic circuits may be provided to correspond to the N kinds of patterns and extract the pilot symbols corresponding to the respective patterns in accordance with the result of the multiplication by the multiplication circuit. The N arithmetic circuits may also calculate the sum of phase differences among the extracted pilot symbols. The frequency offset detector may also include a detection circuit which detects the frequency offset of the reception signal on the basis of a maximum value of the sum calculated by the N arithmetic circuits.

In accordance with another embodiment of the present invention, a method of detecting frequency offset is provided that in some embodiments includes multiplying a reception signal generated by demodulating an orthogonal frequency division multiplex modulated signal, wherein pilot symbols are dispersed and arranged in accordance with N kinds of patterns and periodically transmitted. The method may further included providing N arithmetic circuits corresponding to the N kinds of patterns and extracting the pilot symbols corresponding to the respective patterns in accordance with the result of the multiplication. Additionally, the method may calculate a sum of phase differences among the extracted pilot symbols and detect a frequency offset of the reception signal on the basis of a maximum value of the sum calculated by the N arithmetic circuits.

In accordance with yet another embodiment of the present invention, a system for detecting a frequency offset is provided that in some embodiments includes a means for multiplying a reception signal generated by demodulating an orthogonal frequency division multiplex modulated signal, wherein pilot symbols are dispersed and arranged in accordance with N kinds of patterns and periodically transmitted. The system may further include a means for providing N arithmetic circuits corresponding to the N kinds of patterns and extracting the pilot symbols corresponding to the respective patterns in accordance with the result of the multiplication. Additionally, the system may include a means for calculating a sum of phase differences among the extracted pilot symbols and a means for detecting a frequency offset of the reception signal on the basis of a maximum value of the sum calculated by the N arithmetic circuits.

These and other objects and novel features of the invention will be more fully apparent when the description of the following preferred embodiments are read in conjunction with the accompanying drawings. It is to be noted that the drawings are only illustrative and are not intended to limit the scope of this invention.

BRIEF DESCRIPTION OF THE DRAWINGS

FIG. 7 is a diagram of the configuration of an SP arrangement detector showing another exemplary embodiment of the present invention.

DETAILED DESCRIPTION OF THE INVENTION

The present invention is directed to providing a method and detector of frequency offset adaptable to a great frequency offset of one or more carrier waves in an OFDM signal.

Embodiment 1

Figure 1:
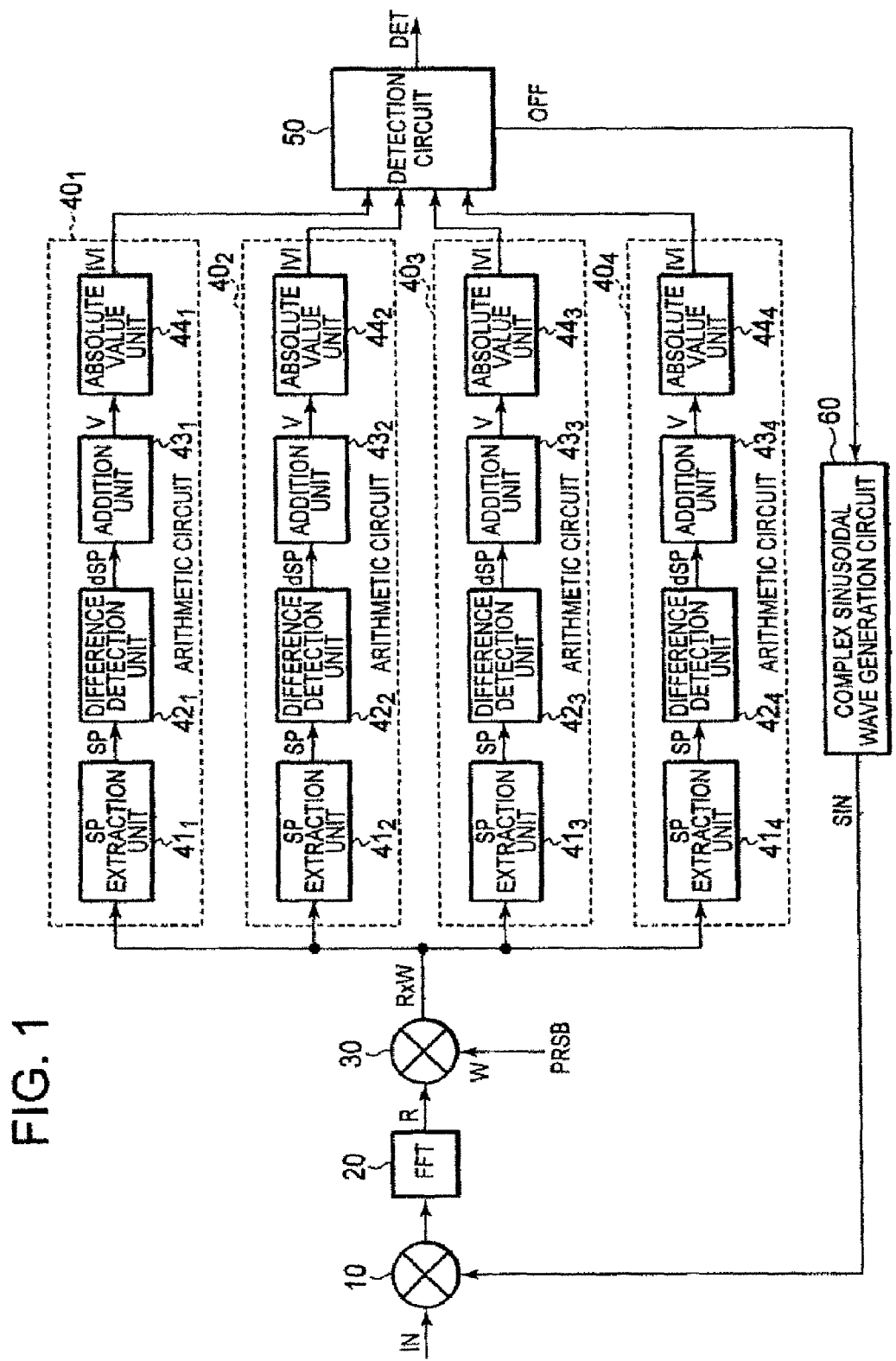
FIG. 1 is a diagram of the configuration of a frequency offset detector according to an exemplary embodiment of the present invention.
Figure 2:
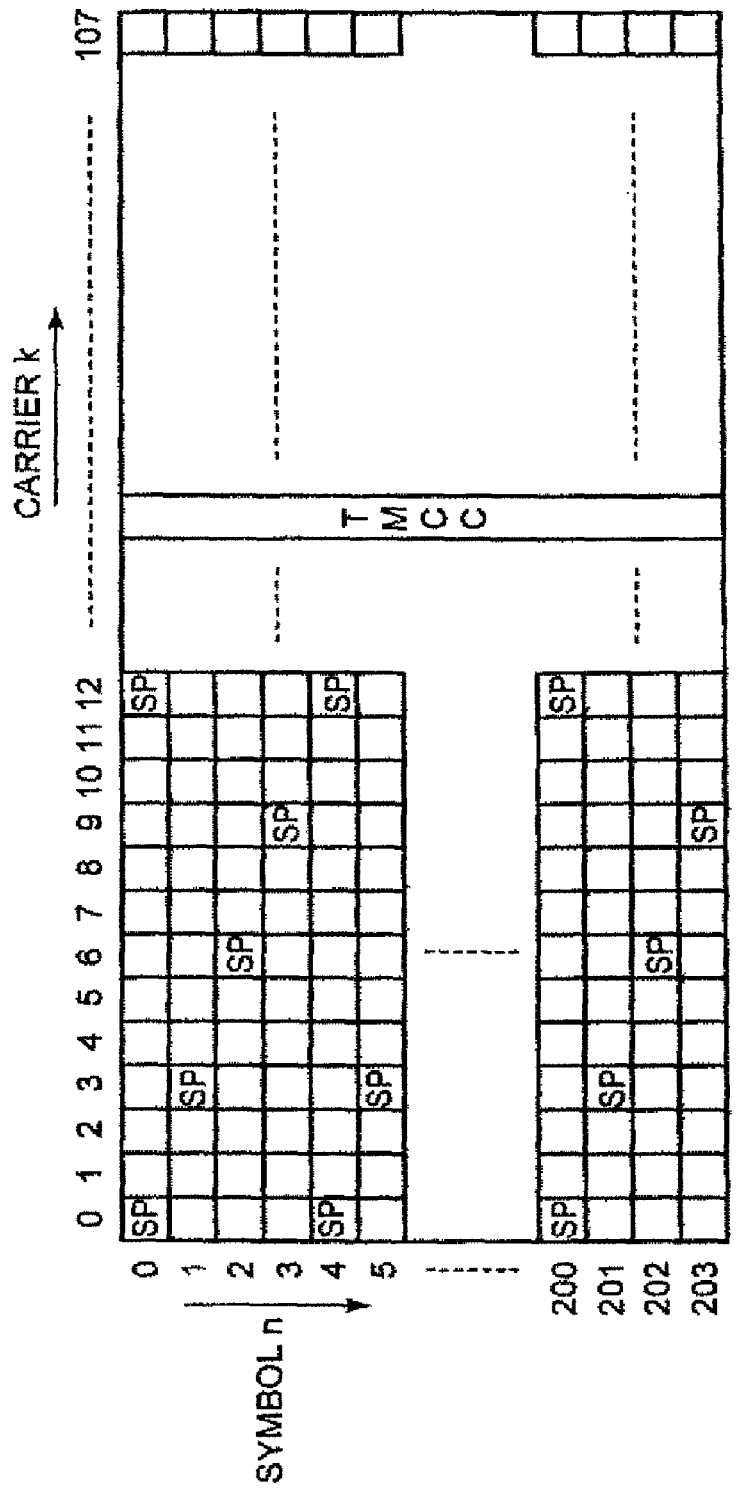
FIG. 2 is a diagram showing an example of the configuration of a transmission frame of ISDB-T.
Figure 3:
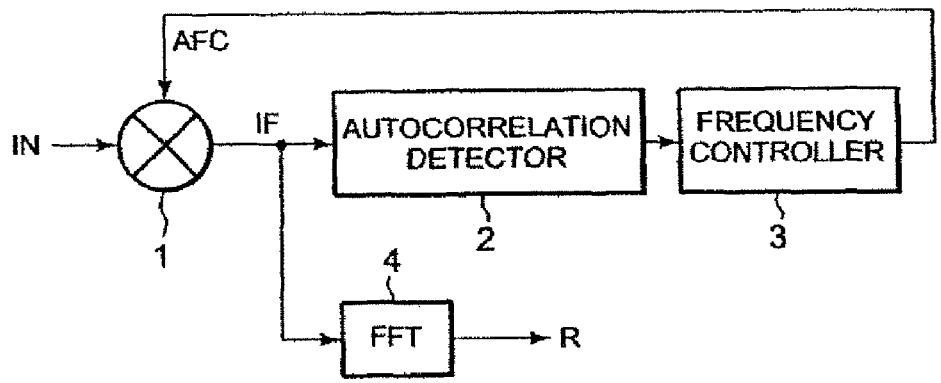
FIG. 3 is a diagram of the configuration of a frequency correcting system in a conventional OFDM receiver.
Figure 4:
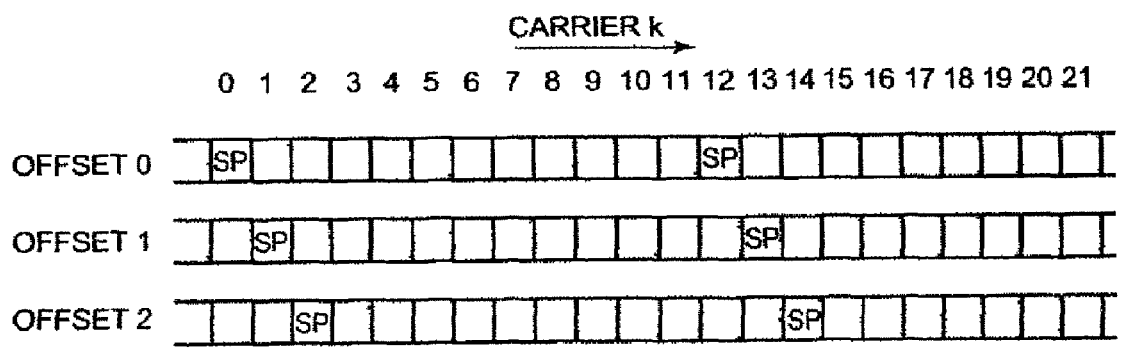
FIG. 4 is a diagram showing the relation between frequency offset and FFT output.

FIG. 1 is a diagram of the configuration of a frequency offset detector showing an exemplary embodiment of the present invention. This frequency offset detector has a frequency conversion circuit 10, and a high-frequency signal based on an OFDM modulation method received by an unshown antenna is converted to an intermediate frequency signal and further converted to a digital signal and then provided as an input signal IN to the frequency conversion circuit 10. The frequency conversion circuit 10 multiplies the input signal IN by a complex sinusoidal signal SIN to convert the frequency of this input signal IN. An FFT 20 is connected to the output side of the frequency conversion circuit 10.

The FFT 20 transforms a signal output from the frequency conversion circuit 10 into a frequency domain signal, and outputs a reception signal R(n, k) for each carrier wave (subcarrier) forming a segment. It is to be noted here that n is a symbol number and k is a carrier number. The reception signal R(n, k) is provided to a multiplication circuit 30.

The multiplication circuit 30 multiplies the reception signal R(n, k) by a value W(k) of a pseudorandom number bit sequence PRBS, and a result R×W of the multiplication by the multiplication circuit 30 is provided to four arithmetic circuits 40$p$ (note that p=1, 2, 3, 4) in common.

The arithmetic circuit 40$p$ performs similar arithmetic processing for each of four SP patterns. Each of the arithmetic circuits 40$p$ comprises an SP extraction unit 41$p$ for extracting SP symbols of a pattern p, a difference detection unit 42$p$ for detecting the phase difference among the SP symbols extracted by the SP extraction unit 41$p$, an addition unit 43$p$ for calculating the sum of the phase differences detected by the difference detection unit 42$p$, and an absolute value unit 44$p$ for finding the absolute value of the sum calculated by the addition unit 43$p$.

The output sides of the four arithmetic circuits 40$p$ are connected to a detection circuit 50 for detecting the number of the pattern p and the frequency offset. The detection circuit 50 outputs a detection signal DET of an SP arrangement and a frequency offset OFF on the basis of a maximum value of the values calculated by the four arithmetic circuits 40p. The detection signal DET output from the detection circuit 50 is provided as a timing signal to an unshown pilot extraction circuit, and the frequency offset OFF is provided to a complex sinusoidal wave generation circuit 60.

The complex sinusoidal wave generation circuit 60 generates a complex sinusoidal signal SIN provided to the frequency conversion circuit 10, in accordance with the frequency offset OFF.

Figure 5:
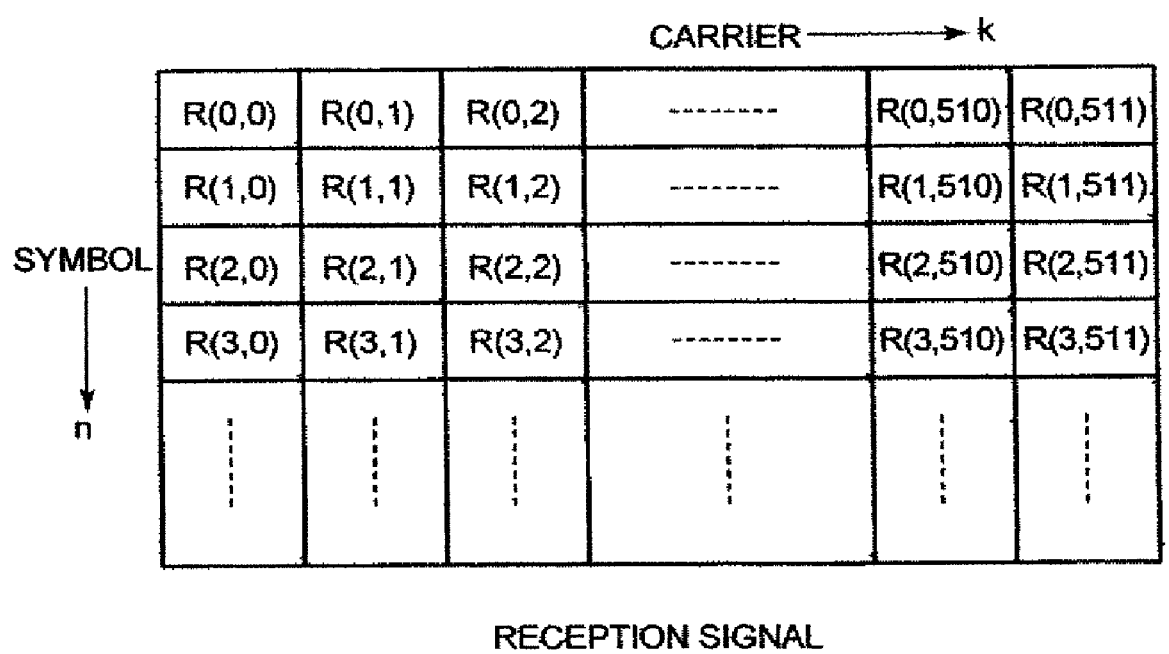
FIG. 5 is a diagram showing the definition of a reception signal according to an exemplary embodiment of the present embodiment.
Figure 6:
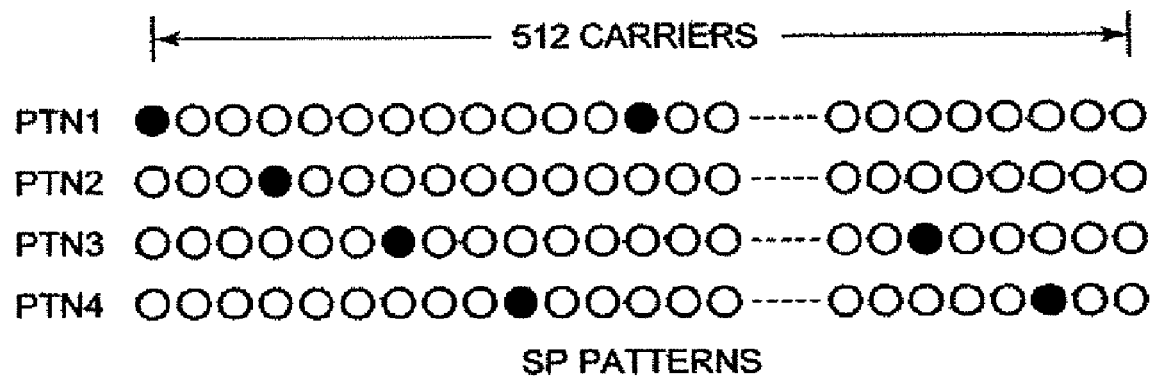
FIG. 6 is a diagram showing four SP patterns.

FIG. 5 is a diagram showing the definition of the reception signal in the present embodiment, and FIG. 6 is a diagram showing four SP patterns. The operation of the configuration in FIG. 1 will be described below referring to FIGS. 5 and 6.

The reception signal R(n, k) represented in complex numbers as shown in FIG. 5 which has been converted to a signal for each carrier wave forming a segment is output from the FFT 20. It is to be noted that n denotes the numbers of symbols arranged in order of time and k denotes the numbers of carriers arranged in order of frequency. In the present embodiment, k=0 to 511, so that 512 carriers are used, as shown in FIG. 5.

The reception signal R(n, k) is multiplied by the value W(k) of the pseudorandom number bit sequence PRBS in the multiplication circuit 30, and a result R(n, k)×W(k) of the multiplication is provided to the four arithmetic circuits 40p in common.

The SP extraction units 41p of the respective arithmetic circuits 40p extract the SP symbols from the multiplication results in accordance with the four SP patterns PTN1, PTN2, PTN3 and PTN4 shown in FIG. 6. It is to be noted that the positions of black circles indicate the SP symbols in FIG. 5. Thus, a signal SP(f, n, p, i) extracted by each of the SP extraction units 41p is as follows:

$$SP(f,n,p,i)=R(n,(p-1)\times 3+i\times 4+f))\times W((p-1)\times 3+i\times 4).$$

Here, i is the SP symbol extracted every twelve carriers out of 432 carriers, and i=0, 1, 2, ..., 35. Moreover, f is an initial value for detecting frequency shifts, and f=0, 1, 2, ..., 40.

36 signals SP(f, n, p, i) extracted by each of the SP extraction units 41p are provided to the corresponding difference detection unit 42p where a phase difference dSP(f, n, p, i) among the extracted SP symbols is detected by the following equation:

$$dSP(f,n,p,i)=SP(f,n,p,i+1)/SP(f,n,p,i).$$

Noted that i=0, 1, 2, ..., 34.

The phase difference dSP(f, n, p, i) detected by each of the difference detection units 42p is provided to the corresponding addition unit 43p, and a sum V(f, n, p) of the phase differences is calculated as follows:

$$V(f,n,p)=dSP(f,n,p,0)+dSP(f,n,p,1)+\ldots+dSP(f,n,p,34).$$

The sum V(n, p) of the phase differences calculated by each of the addition units 13p is provided to the corresponding absolute value unit 14p where an absolute value |V(f, n, p)| of the calculated sum is calculated.

Furthermore, the absolute value |V(f, n, p)| calculated by each of the absolute value units 44p is provided to the detection circuit 50 where the maximum value of the absolute values calculated by the four arithmetic circuits 40p is detected, and a number p of the arithmetic circuit 40p outputting this maximum value is output as the detection signal DET of the pattern corresponding to its symbol number n. Moreover, the value of f corresponding to the maximum value is output as the frequency offset OFF.

The frequency offset OFF is provided to the complex sinusoidal wave generation circuit 60, and a complex sinusoidal wave SIN having a frequency corresponding to the value of the frequency offset OFF is generated. The generated complex sinusoidal wave SIN is provided to the frequency conversion circuit 10. Thus, the frequency of the input signal IN is output to the FFT 20 so that the complex sinusoidal wave SIN alone is displaced. Consequently, a signal without any frequency offset is provided to the FFT 20.

As described above, the frequency offset detector in Embodiment 1 has the arithmetic circuit 10p for extracting the SP symbols for each of the four SP patterns and calculating the absolute value of the sum of differences among the extracted SP symbols, and the detection circuit 20 for detecting the arithmetic circuit 10p outputting the maximum absolute value to detect the frequency offset OFF from the maximum value. Thus, there is an advantage that the frequency of the input signal IN can be corrected on the basis of the detected frequency offset OFF even if a great frequency offset of one or more carrier waves is produced. There is also an advantage that the speed of response is high because the frequency offset can be detected by the reception signal R of one symbol period.

Embodiment 2

FIG. 7 is a diagram of the configuration of the frequency offset detector showing an exemplary embodiment of the present invention, and the same numerals are assigned to the same elements as those in FIG. 1.

In this frequency offset detector, a weighted average circuit 45p configured by, for example, an infinite impulse response (IIR) filter is provided on the output side of an absolute value unit 44p of each of the arithmetic circuits 40p in the frequency offset detector of FIG. 1. This configuration is similar to that in FIG. 1 in other respects.

In this frequency offset detector, the following operation is performed by the weighted average circuit 45p on an absolute value V(f, n, p) output from the absolute value unit 44p of each of the arithmetic circuits 40p, and a signal S(f, n, p) is output.

$$S(f,n,p)=\alpha\times S(f,n-1,(p-1)\bmod 4)+(1-\alpha)\times |V(f,n,p)|$$

Note that α<1.

Thus, there is an advantage that a frequency offset can be detected in a stable state even in a poor environment where receiving conditions vary with the symbol because the signal S(f, n, p) output from the weighted average circuit 45p is the weighted average of past symbol calculation results and a current calculation result.

It is to be noted that the present invention is not limited to the embodiments described above, and various modifications can be made. For example, there are modifications as follows:

(a) Although the FFT 20 outputs the reception signal R having 512 carriers, the number of carriers is not limited to 512, and it is also possible to apply, for example, 108 carriers described in connection with background art.

(b) While the difference detection unit 42p in Embodiment 1 calculates a phase difference including amplitude information when detecting the phase difference dSP among the extracted SP symbols, the amplitude information may be removed so that the phase difference alone is purely calculated. This can reduce the amount of calculations.

(c) The arrangement pattern of the SP symbols is not limited to the illustration in FIG. 6. That is, the present invention is also applicable to a reception signal generated by demodulating an OFDM modulated signal wherein pilot symbols are dispersed and arranged in accordance with arbitrary N kinds of patterns and periodically transmitted. In that case, N arithmetic circuits 40 are needed to correspond to the N kinds of patterns.

(d) Although the present embodiments have been described with the circuit configuration built by hardware such as the arithmetic circuits 40, it is also possible to have a configuration which performs processing under software control using a processor such as a digital signal processor (DSP).

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What we claim is:

1. A frequency offset detector comprising:
   a multiplication circuit which multiplies, by a pseudorandom number bit sequence, a reception signal generated by demodulating an orthogonal frequency division multiplex modulated signal wherein pilot symbols are dispersed and arranged in accordance with N kinds of patterns and periodically transmitted;
   N arithmetic circuits which are provided to correspond to the N kinds of patterns and which extract the pilot symbols corresponding to the respective patterns in accordance with the result of the multiplication by the multiplication circuit and calculate the sum of phase differences among the extracted pilot symbols; and
   a detection circuit which detects the frequency offset of the reception signal on the basis of a maximum value of the sum calculated by the N arithmetic circuits.

2. The frequency offset detector according to claim 1, wherein each of the arithmetic circuits is constituted of:
   an extraction unit which extracts, from the result of the multiplication by the multiplication circuit, the pilot symbols dispersed and arranged in accordance with the corresponding pattern among the N kinds of patterns;
   a difference detection unit which detects the phase difference among the pilot symbols extracted in the extraction unit;
   an addition unit which calculates the sum of the phase differences among the pilot symbols detected in the difference detection unit; and
   an absolute value unit which calculates an absolute value of the sum of the phase differences calculated in the addition unit.

3. The frequency offset detector according to claim 2, wherein each of the arithmetic circuits is provided with a weighted average unit, the weighted average unit calculating a weighted average value in which a previously calculated absolute value is added to the absolute value calculated in the absolute value unit, and outputting the weighted average value to the pattern detection circuit.

4. The frequency offset detector according to claim 1, wherein there are four kinds of patterns, and the pilot symbols are dispersed and arranged and thus transmitted every four symbol periods by one out of twelve subcarriers in order of frequency.

5. The frequency offset detector according to claim 2, wherein there are four kinds of patterns, and the pilot symbols are dispersed and arranged and thus transmitted every four symbol periods by one out of twelve subcarriers in order of frequency.

6. The frequency offset detector according to claim 3, wherein there are four kinds of patterns, and the pilot symbols are dispersed and arranged and thus transmitted every four symbol periods by one out of twelve subcarriers in order of frequency.

7. A method of detecting a frequency offset comprising:
   multiplying a reception signal generated by demodulating an orthogonal frequency division multiplex modulated signal wherein pilot symbols are dispersed and arranged in accordance with N kinds of patterns and periodically transmitted;
   providing N arithmetic circuits corresponding to the N kinds of patterns and extracting the pilot symbols corresponding to the respective patterns in accordance with the result of the multiplication;
   calculating a sum of phase differences among the extracted pilot symbols; and
   detecting a frequency offset of the reception signal on the basis of a maximum value of the sum calculated by the N arithmetic circuits.

8. The method of claim 7, wherein the multiplying step includes using a pseudorandom number bit sequence.

9. The method of claim 7, further comprising:
   extracting, from the result of the multiplication, the pilot symbols dispersed and arranged in accordance with the corresponding pattern among the N kinds of patterns;
   detecting the phase difference among the extracted pilot symbols;
   calculating the sum of the phase differences among the pilot symbols; and
   calculating an absolute value of the sum of the phase differences.

10. The method of claim 9, further comprising:
    calculating a weighted average value in which a previously calculated absolute value is added to the absolute value; and
    outputting the weighted average value to a predetermined circuit.

11. The method of claim 10, further comprising:
    generating a complex sinusoidal wave based on the detected frequency offset.

12. The method of claim 11, further comprising:
    eliminating the frequency offset in the reception signal by adjusting the sinusoidal wave.

13. The method according to claim 7, further comprising:
    providing four kinds of patterns, and
    dispersing, arranging, and transmitting the pilot symbols every four symbol periods by one out of twelve subcarriers in order of frequency.

14. The method according to claim 9, further comprising:
    providing four kinds of patterns, and
    dispersing, arranging, and transmitting the pilot symbols every four symbol periods by one out of twelve subcarriers in order of frequency.

15. The method according to claim 10, further comprising:
    providing four kinds of patterns, and
    dispersing, arranging, and transmitting the pilot symbols every four symbol periods by one out of twelve subcarriers in order of frequency.

16. The method of claim 10, wherein the predetermined circuit comprises a pattern detection circuit.

17. The method of claim 10, wherein the calculated weighted average value is calculated by a weighted average unit provided in each of the arithmetic circuits.

18. A system for detecting a frequency offset comprising:
means for multiplying a reception signal generated by demodulating an orthogonal frequency division multiplex modulated signal wherein pilot symbols are dispersed and arranged in accordance with N kinds of patterns and periodically transmitted;
means for providing N arithmetic circuits corresponding to the N kinds of patterns and extracting the pilot symbols corresponding to the respective patterns in accordance with the result of the multiplication;
means for calculating a sum of phase differences among the extracted pilot symbols; and
means for detecting a frequency offset of the reception signal on the basis of a maximum value of the sum calculated by the N arithmetic circuits.

19. The system of claim 18, wherein the multiplying means comprises a multiplication circuit.

20. The system of claim 18, wherein the detecting means comprises a detection circuit.

21. The system of claim 18, further comprising:
means for extracting, from the result of the multiplication, the pilot symbols dispersed and arranged in accordance with the corresponding pattern among the N kinds of patterns;
means for detecting the phase difference among the extracted pilot symbols;
means for calculating the sum of the phase differences among the pilot symbols; and
means for calculating an absolute value of the sum of the phase differences.

22. The system of claim 21, further comprising:
means for calculating a weighted average value in which a previously calculated absolute value is added to the absolute value; and
means for outputting the weighted average value to a predetermined circuit.

23. The system of claim 22, wherein the means for calculating a weighted average value comprises at least one arithmetic circuit provided with a weighted average unit.

24. The method of claim 22, wherein the predetermined circuit comprises a pattern detection circuit.

* * * * *